US 8,184,358 B2

(12) United States Patent
Chui

(10) Patent No.: US 8,184,358 B2
(45) Date of Patent: *May 22, 2012

(54) SYSTEMS AND METHODS USING INTERFEROMETRIC OPTICAL MODULATORS AND DIFFUSERS

(75) Inventor: Clarence Chui, San Jose, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/093,532

(22) Filed: Apr. 25, 2011

(65) Prior Publication Data

US 2011/0199669 A1 Aug. 18, 2011

Related U.S. Application Data

(63) Continuation of application No. 12/607,932, filed on Oct. 28, 2009, now Pat. No. 7,944,602, which is a continuation of application No. 11/209,143, filed on Aug. 22, 2005, now Pat. No. 7,710,636.

(60) Provisional application No. 60/613,568, filed on Sep. 27, 2004.

(51) Int. Cl.
*G02B 26/00* (2006.01)
*G02F 1/03* (2006.01)

(52) U.S. Cl. ........ 359/290; 359/291; 359/237; 359/260; 359/316; 359/318

(58) Field of Classification Search .......... 359/290–295, 359/298, 245, 260, 237–239, 315, 316, 318; 345/32, 33, 84, 85, 95, 100, 102; 356/405, 356/406, 408, 422, 425, 450, 486
See application file for complete search history.

(56) References Cited

U.S. PATENT DOCUMENTS

| 2,518,647 | A | 8/1950 | Teeple et al. |
| 6,040,937 | A | 3/2000 | Miles |
| 6,211,976 | B1 | 4/2001 | Popovich |
| 6,674,562 | B1 | 1/2004 | Miles |
| 6,970,031 | B1 | 11/2005 | Martin |
| 7,042,643 | B2 | 5/2006 | Miles |
| 7,099,058 | B2 | 8/2006 | Takemori et al. |

(Continued)

FOREIGN PATENT DOCUMENTS

DE 102 28 946 1/2004

(Continued)

OTHER PUBLICATIONS

Miles, M. et al., "Digital Paper™ for reflective displays," Journal of the Society for Information Display, Society for Information Display, San Jose, US, vol. 11, No. 1, pp. 209-215, 2003.

(Continued)

*Primary Examiner* — Loha Ben
(74) *Attorney, Agent, or Firm* — Knobbe, Martens, Olson & Bear, LLP

(57) ABSTRACT

Various embodiments include interferometric optical modulators comprising a substrate layer having a thickness between about 0.1 mm to about 0.45 mm thick and a method for manufacturing the same. The interferometric modulator can be integrated together with a diffuser in a display device. The thin substrate permits use of a thicker diffuser. The thinner substrate may increase resolution and reduce overall thickness of the inteferometric modulator. The thicker diffuser may provide increased diffusion and durability.

37 Claims, 9 Drawing Sheets

U.S. PATENT DOCUMENTS

| | | | |
|---|---|---|---|
| 7,123,216 | B1 | 10/2006 | Miles |
| 7,324,248 | B2 | 1/2008 | Brotherton-Ratcliffe et al. |
| 7,369,294 | B2 | 5/2008 | Gally |
| 7,417,735 | B2 | 8/2008 | Cummings |
| 7,498,621 | B2 | 3/2009 | Seitz |
| 7,508,571 | B2 | 3/2009 | Gally |
| 7,561,323 | B2 | 7/2009 | Gally |
| 7,564,612 | B2 | 7/2009 | Chui |
| 7,630,123 | B2 | 12/2009 | Kothari |
| 7,710,636 | B2 * | 5/2010 | Chui .............................. 359/295 |
| 7,807,488 | B2 | 10/2010 | Gally |
| 7,944,602 | B2 * | 5/2011 | Chui .............................. 359/290 |
| 2004/0188599 | A1 | 9/2004 | Viktorovitch |
| 2006/0066935 | A1 | 3/2006 | Cummings |

FOREIGN PATENT DOCUMENTS

JP          11 211999          8/1999

OTHER PUBLICATIONS

Office Action in U.S. Appl. No. 11/209,143, Jan. 2, 2009.
Request for Continued Examination, Amendment, and Information Disclosure Statement in U.S. Appl. No. 11/209,143, Mar. 2, 2009.
Notice of Allowance in U.S. Appl. No. 11/29,143, dated Mar. 31, 2009.
Request for Continued Examination and Information Disclosure Statement in U.S. Appl. No. 11/209,143, dated Jun. 29, 2009.
Notice of Allowance in U.S. Appl. No. 11/209,143, dated Jul. 29, 2009.
Request for Continued Examination and Information Disclosure Statement in U.S. Appl. No. 11/209,143, dated Oct. 29, 2009.
Notice of Allowance in U.S. Appl. No. 11/209,143, dated Nov. 5, 2009.
Preliminary Amendment and Information Disclosure Statement in U.S. Appl. No. 11/209,143, dated Nov. 6, 2009.
Supplemental Notice of Allowance in U.S. Appl. No. 11/209,143, dated Nov. 17, 2009.
Amendment After Allowance Under 37 C.F.R. § 1.312, Issue Fee, and Statement of Reason for Allowance in U.S. Appl. No. 11/209,143, dated Feb. 5, 2010.
Applicant Summary of Inerview in U.S. Appl. No. 11/209,143, dated Feb. 11, 2010.
Response to 312 Amendment and Examiner Interview Summary in U.S. Appl. No. 11/209,143, dated Feb. 22, 2010.
Preliminary Amendment in U.S. Appl. No. 12/607,932, dated Jun. 24, 2010.
Notice of Allowance in U.S. Appl. No. 12/207,932, dated Aug. 30, 2010.
Request for Continued Examination and Information Disclosure Statement in U.S. Appl. No. 12/607,932, dated Nov. 24, 2010.
Notice of Allowance in U.S. Appl. No. 12/607,932, dated Jan. 19, 2011.
Issue Fee Payment, Comments, and Information Disclosure Statement in U.S. Appl. No. 12/607,932, dated Apr. 8, 2011.
Official Communication in Canadian Patent Application No. 2,577,816, dated Jun. 6, 2011.
Official Communication in European Application No. 05797591.4 dated Jul. 19, 2007.
Official Communication in European Application No. 05797591.4 dated Jan. 15, 2009.
Official Communication in European Application No. 05797591.4 dated Jul. 28, 2010.
Extended European Search Report in U.S. Appl. No. 10/171,329 (Publication No. EP 2241924), dated Sep. 17, 2010.
Extended European Search Report in U.S. Appl. No. 10/171,331 (Publication No. EP 2241925), dated Sep. 5, 2010.
International Search Report and Written Opinion in PCT/US2005/033056 (International Publication No. WO 2006/036588) dated Jan. 30, 2006.
International Preliminary Report of Patentability in Application No. PCT/US05/033056 dated Mar. 27, 2007.

* cited by examiner

|  | Column Output Signals | |
|---|---|---|
|  | $+V_{bias}$ | $-V_{bias}$ |
| Row Output Signals   0 | Stable | Stable |
| $+\Delta V$ | Relax | Actuate |
| $-\Delta V$ | Actuate | Relax |

# SYSTEMS AND METHODS USING INTERFEROMETRIC OPTICAL MODULATORS AND DIFFUSERS

PRIORITY APPLICATIONS

This application is a continuation of U.S. patent application Ser. No. 12/607,932, filed Oct. 28, 2009, entitled "SYSTEMS AND METHODS USING INTERFEROMETRIC OPTICAL MODULATORS AND DIFFUSERS," now U.S. Pat. No. 7,944,602, which is a continuation of U.S. patent application Ser. No. 11/209,143, filed Aug. 22, 2005, entitled "SYSTEMS AND METHODS USING INTERFEROMETRIC OPTICAL MODULATORS AND DIFFUSERS," now U.S. Pat. No. 7,710,636, which claims priority to U.S. Provisional Application No. 60/613,568, entitled "SYSTEM AND METHOD FOR INTERFEROMETRIC OPTICAL MODULATOR AND DIFFUSER," filed Sep. 27, 2004; all of the above applications are hereby incorporated by reference herein in their entirety.

BACKGROUND

1. Field of the Invention

The field of the invention relates to microelectromechanical systems (MEMS).

2. Description of the Related Technology

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY OF CERTAIN EMBODIMENTS

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages over other display devices.

One embodiment includes a display comprising a plurality of display elements, each of the display elements comprising a movable reflector, a partial reflector positioned at a distance from the movable reflector thereby forming an optical resonator cavity, said movable reflector and said partial reflector separated by a gap, a diffuser portion disposed forward the movable and partial reflectors, and an electrode configured to cause said movable reflector to move with respect to said partial reflector and to alter said optical resonator cavity, wherein (i) the plurality of display elements has a reflectivity at a viewing angle of about 45° that is greater than about 75% of the reflectivity of the plurality of display elements when viewed from normal and (ii) the diffuser portions are disposed sufficiently close to the partially reflective layers such that the plurality of display elements achieve a contrast of greater than about 5 to 1 while using a displayed test pattern of alternating white and black lines of a spatial period of less than about 0.45 millimeter.

Another embodiment has a display comprising a plurality of display elements, each of the display elements comprising means for spatially modulating light by interferometrically modulating reflectivity, said spatial modulating means having a maximum resolution less than about 0.45 millimeter, and means for diffusing said light, wherein (i) in one state, said plurality of display element have a reflectivity at a viewing angle of about 45° that is greater than about 75% of the reflectivity of the display when viewed from normal, and (ii) said plurality of display elements produce a display contrast greater than about 5 to 1 for a test pattern comprising alternating white and black lines with said maximum resolution of said spatial modulating means.

Still another embodiment has a method of manufacturing a display comprising a plurality of display elements, said method comprising forming a movable reflector, forming a partial reflector positioned at a distance from the movable reflector thereby forming an optical resonator cavity, said movable reflector and said partial reflector separated by a gap such that said movable reflector can move toward said partial reflector to modulate said optical resonator cavity, forming a diffuser disposed within about 0.45 millimeter or less of the partially reflective layer, and forming an electrode configured to cause said movable reflector to move with respect to said partial reflector.

Yet another embodiment has a display comprising a plurality of display elements, each of the display elements comprising a movable reflector, a partial reflector positioned at a distance from the movable reflector thereby forming an optical resonator cavity, an electrode configured to cause said movable minor to move with respect to said partial reflector to alter said optical resonator cavity, and a substrate, said movable reflector, said partial reflector and said electrode disposed on one side of a substrate, said substrate having a thickness of about 0.45 millimeter or less.

Still another embodiment has a display comprising a plurality of display elements, each of the display elements comprising a movable reflector, a partial reflector positioned at a distance from the movable reflector thereby forming an optical resonator cavity, said movable reflector and said partial reflector separated by a gap, a diffuser portion disposed forward the movable and partial reflectors, and an electrode configured to cause said movable reflector to move with respect to said partial reflector and to alter said optical resonator cavity, wherein said diffuser portion is disposed within about 0.45 millimeter of said partial reflector.

DETAILED DESCRIPTION OF CERTAIN EMBODIMENTS

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Various embodiments of the invention include an interferometric optical modulator comprising a substrate layer having a thickness between about 0.1 mm and about 0.5 mm thick. Such an interferometric modulator may be integrated with a diffuser in a display device. The thin substrate permits the use of a thicker diffuser, while maintaining a substantially equal or thinner thickness of the display device. In some embodiments, the interferometric optical modulator comprises a substrate having a first face and a second face, an optical stack fabricated on the first face of the substrate, a mirror/mechanical assembly spaced from the optical stack, and a diffuser applied to the second face of the substrate, wherein the substrate is less than about 0.5 mm thick. The diffuser may be greater than about 0.1 mm thick in certain embodiments.

Figure 1:
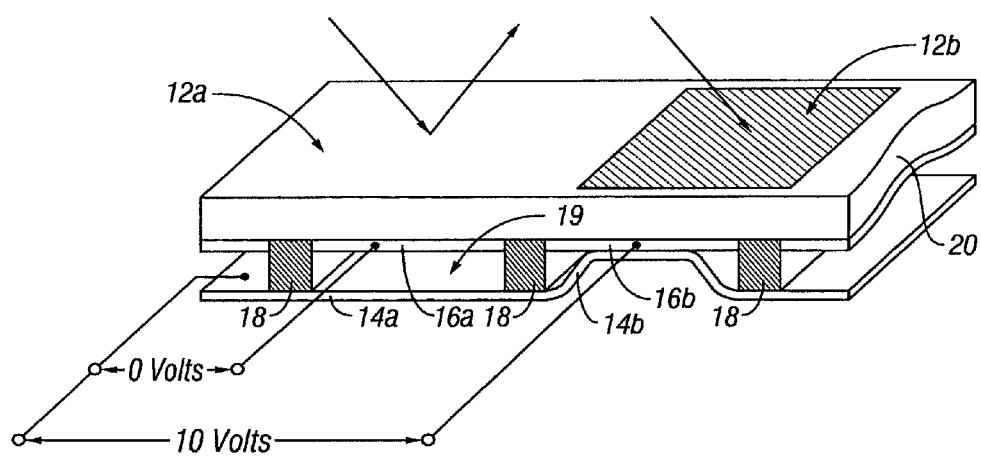
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise of several fused layers, which can include an electrode layer, such as indium tin oxide (ITO), a partially reflective layer, such as chromium, and a transparent dielectric. The optical stack 16 is thus electrically conductive, partially transparent and partially reflective, and may be fabricated, for example, by depositing one or more of the above layers onto a transparent substrate 20. In some embodiments, the layers are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device.

With no applied voltage, the cavity 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5 illustrate one exemplary process and system for using an array of interferometric modulators in a display application.

Figure 2:
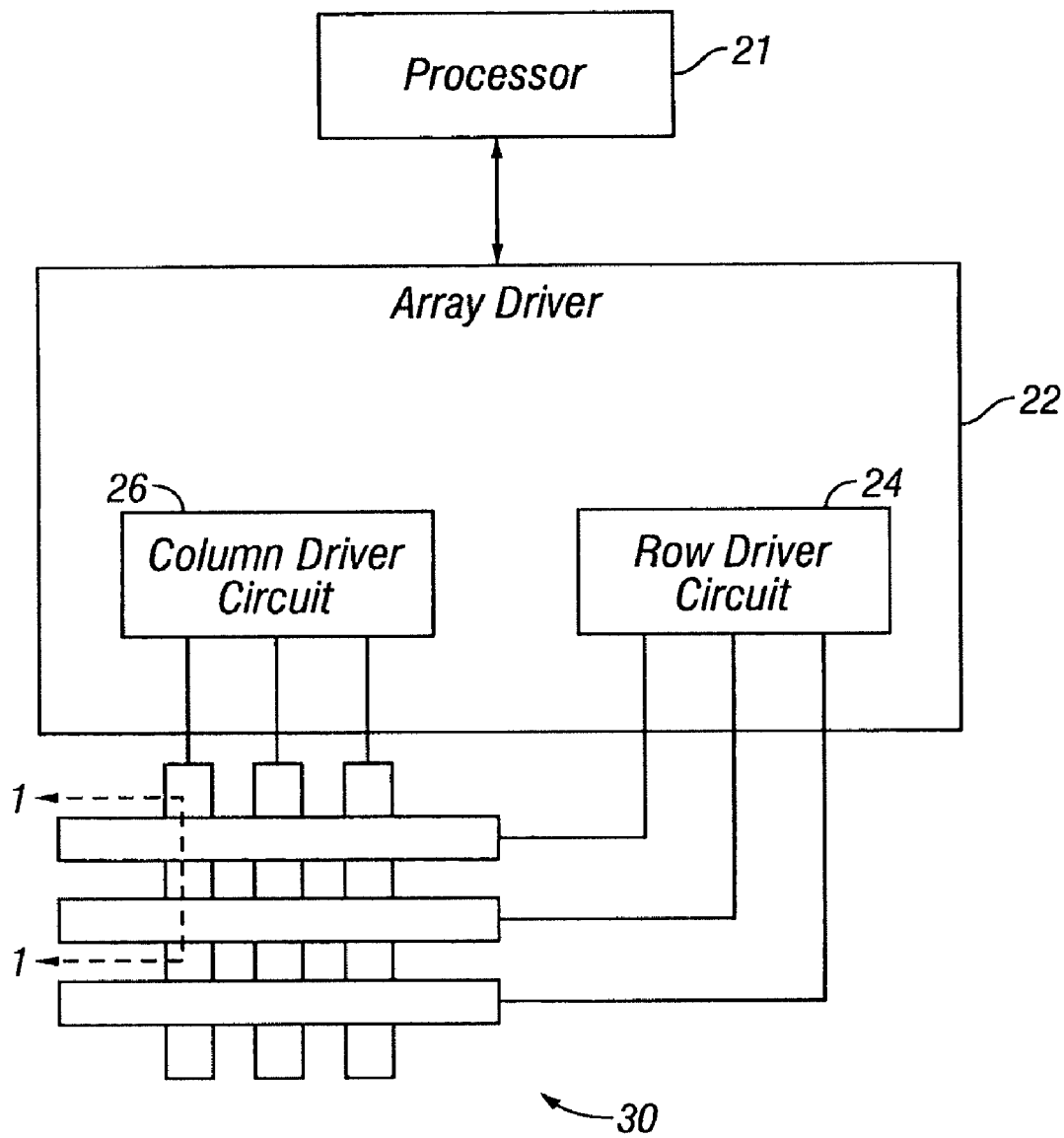
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a panel or display array (display) 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volt. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
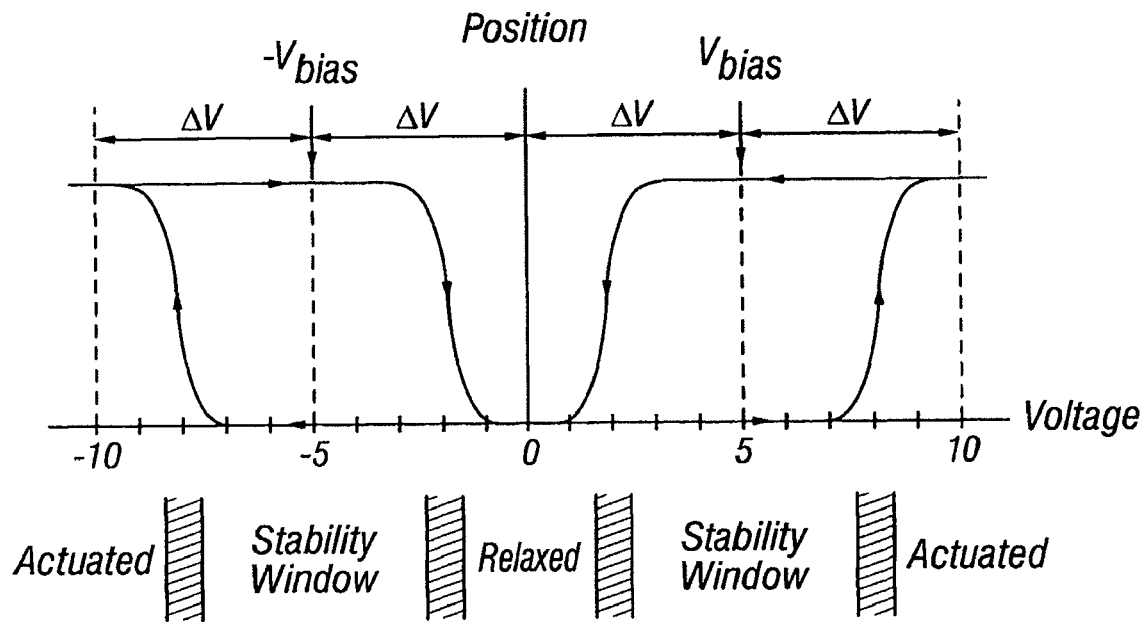
FIG. 3 is a diagram of movable minor position versus applied voltage for one exemplary embodiment of an interferometric modulator of FIG. 1.
FIG. 4 is an illustration of a set of row and column voltages that may be used to drive an interferometric modulator display.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively Relaxing the pixel is accomplished by setting the appropriate column to $+V_{bias}$, and the appropriate row to the same $+\Delta V$, producing a zero volt potential difference across the pixel. In those rows where the row voltage is held at zero volt, the pixels are stable in whatever state they were originally in, regardless of whether the column is at $+V_{bias}$, or $V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

Figure 5A:
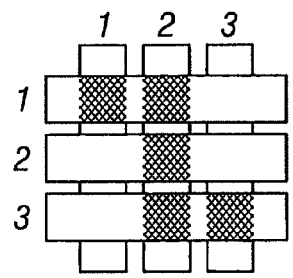
FIGS. 5A and 5B illustrate one exemplary timing diagram for row and column signals that may be used to write a frame of display data to the 3×3 interferometric modulator display of FIG. 2.
Figure 5B:
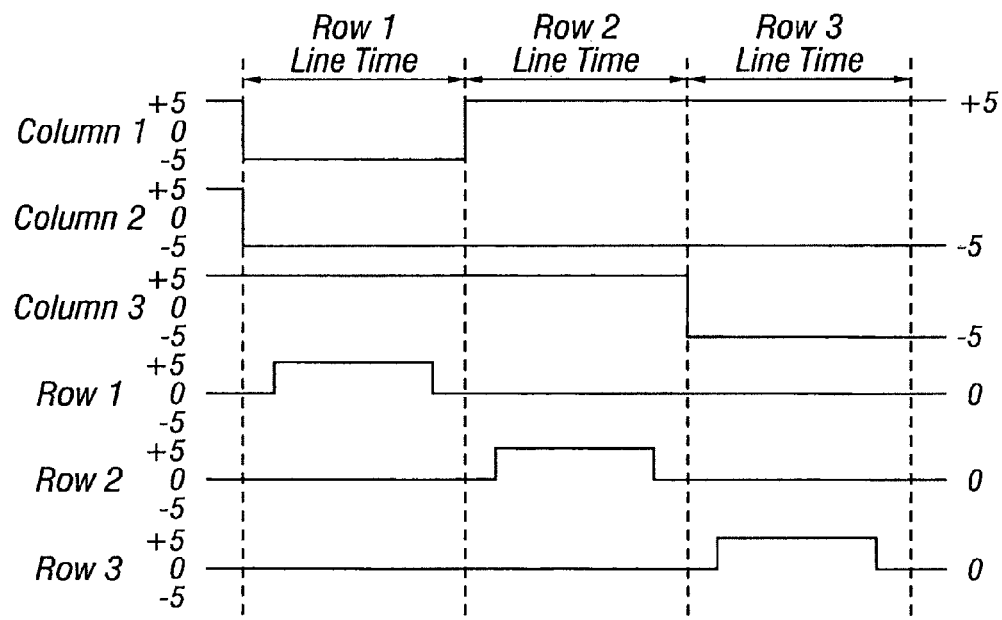

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volt, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
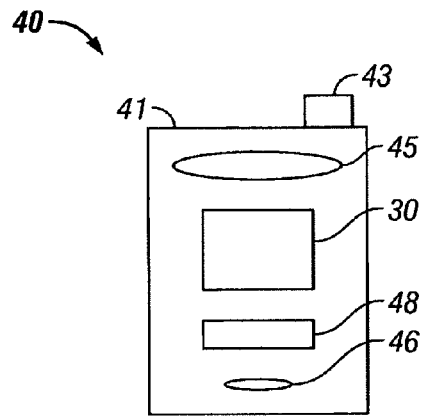
FIGS. 6A and 6B are system block diagrams illustrating an embodiment of a visual display device comprising a plurality of interferometric modulators.
Figure 6B:
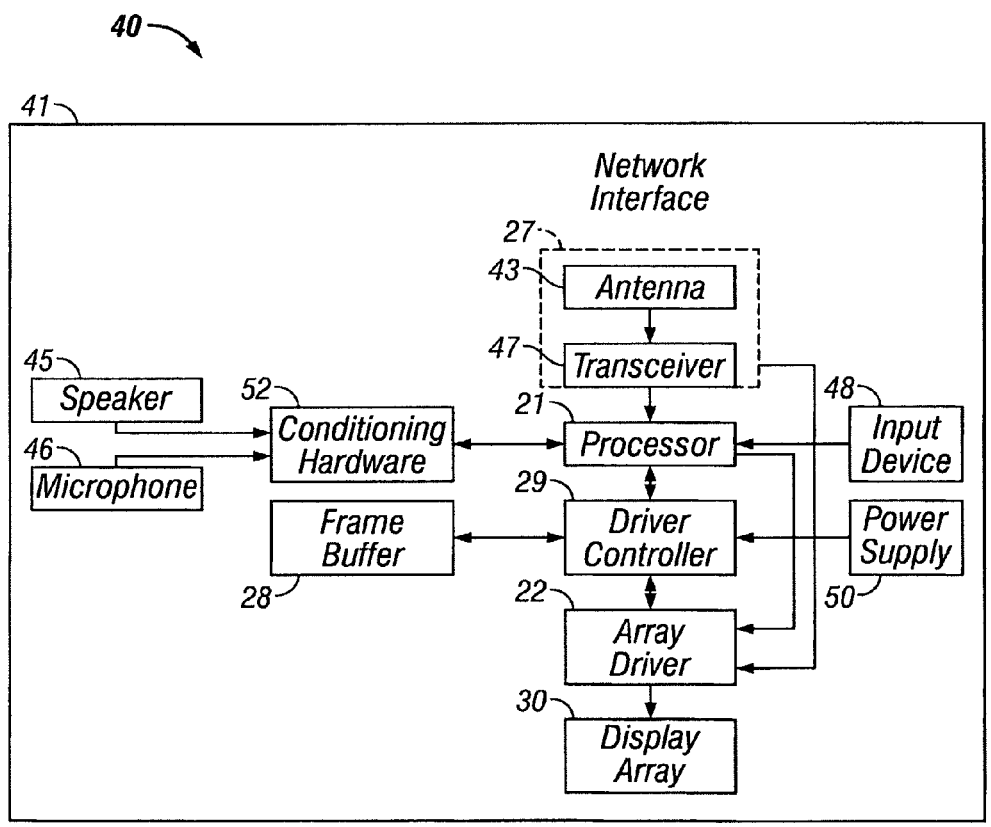

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 45, an input device 48, and a microphone 46. The housing 41 is generally formed from any of a variety of manufacturing processes as are well known to those of skill in the art, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to the processor 21, which is connected to conditioning hardware 52. The conditioning hardware 52 may be configured to condition a signal (e.g. filter a signal). The conditioning hardware 52 is connected to a speaker 45 and a microphone 46. The processor 21 is also connected to an input device 48 and a driver controller 29. The driver controller 29 is coupled to a frame buffer 28 and to the array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one or more devices over a network. In one embodiment the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In some implementations control programmability resides, as described above, in a driver controller which can be located in several places in the electronic display system. In some cases control programmability resides in the array driver 22. Those of skill in the art will recognize that the above-described optimization may be implemented in any number of hardware and/or software components and in various configurations.

Figure 7A:
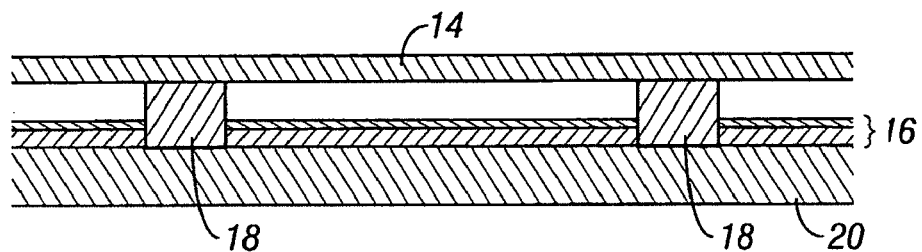
FIG. 7A is a cross section of the device of FIG. 1.
Figure 7B:
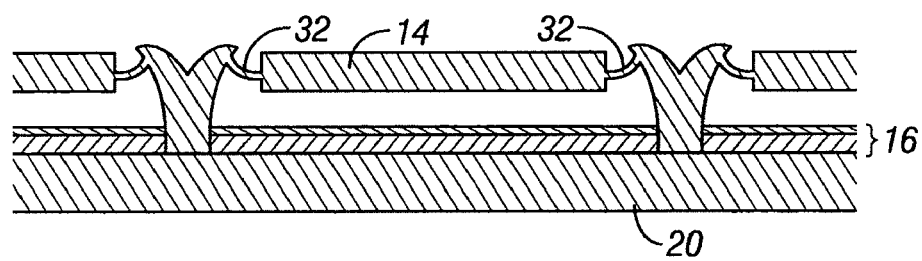
FIG. 7B is a cross section of an alternative embodiment of an interferometric modulator.
Figure 7C:
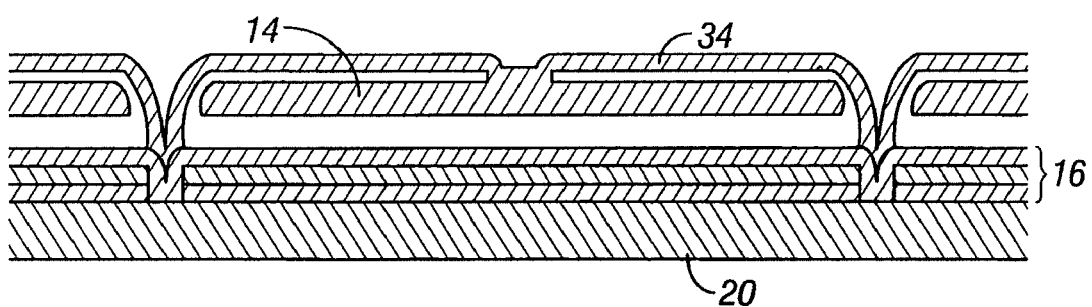
FIG. 7C is a cross section of another alternative embodiment of an interferometric modulator.
Figure 7D:
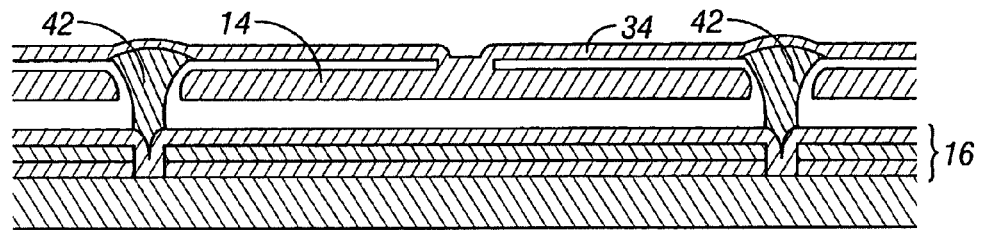
FIG. 7D is a cross section of yet another alternative embodiment of an interferometric modulator.
Figure 7E:
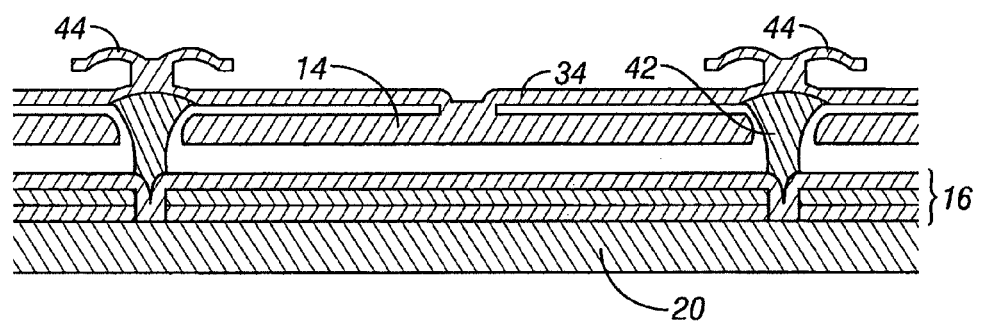
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 is attached to supports at the corners only, on tethers 32. In FIG. 7C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the cavity, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields some portions of the interferometric modulator on the side of the reflective layer opposite the substrate 20, including the deformable layer 34 and the bus structure 44. This allows the shielded areas to be configured and operated upon without negatively affecting the image quality. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

An advantage of interferometric modulator devices is that unlike other display technologies such as LCDs, a polarizer is not required. Because there is no polarizer, incident light of all polarizations can be used, rather than sacrificing half of the light to ensure known polarization.

Because the mirrors in interferometric modulator devices are specular, a diffuser may be used to modify the look of the display to be more diffuse, for example, more like paper. This diffuser may comprise a diffusing film. This diffusing film may be interposed between the inteferometric modulator and the viewer. The diffusing film can be applied to the substrate of the interferometric optical modulator after fabrication of this interferometric modulators. The diffuser may comprise a polymer film, for example, polyester or polycarbonate, having a thickness from about 50 μm to about 100 μm. Such films can be fragile, thereby reducing the yield of the devices because the optical defects introduced by improperly handled films. Such films also often do not provide the desired level of diffusion. Furthermore, such films are often difficult to manufacture, making them expensive and difficult to obtain. A thicker diffuser, however, will increase the overall thickness of the device.

Accordingly, in certain embodiments a display device may be fabricated that comprises an interferometric modulator comprising a thin transparent substrate. This thin substrate permits the use of a thicker diffuser while maintaining an acceptable stack height. Structures and methods for fabricating interferometric optical modulators are known in the art are described above as well as in, for example, in U.S. Pat. No. 5,835,255, which is incorporated herein by reference in its entirety. U.S. application Ser. No. 10/941,042, titled "Method for fabricating a Structure for a Microelectromechanical System (MEMS) Device", filed Sep. 14, 2004, now U.S. Pat. No. 7,250,315, U.S. Provisional Application No. 60/613,496, titled "Method of Fabricating Interferometric Devices using Lift-Off Processing Techniques", filed Sep. 27, 2004, and U.S. Provisional Application No. 60/613,452, titled "Method of Making a Reflective Display Device using thin Film Transistor Production Techniques", filed Sep. 27, 2004, also describe structure and methods for fabricating interferometric modulators, and are incorporated herein by reference in their entirety.

Figure 8:
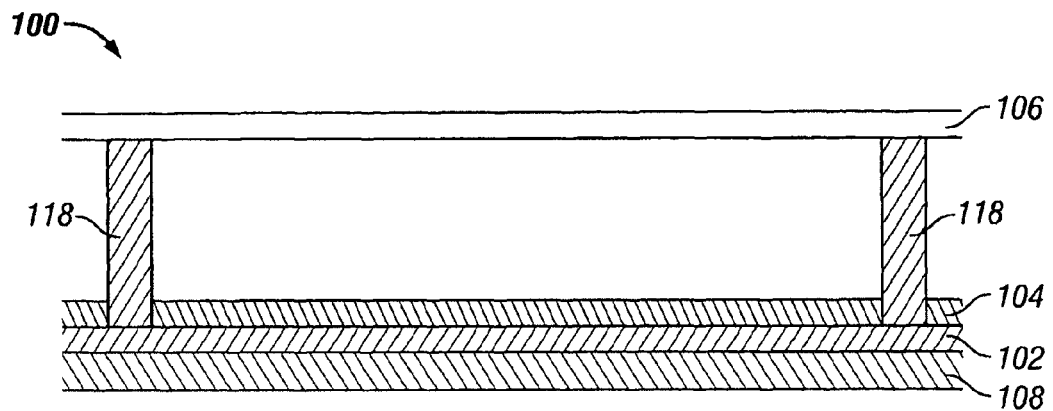
FIG. 8 illustrates a cross-section of an embodiment of a display device comprising an interferometric optical modulator and a diffuser.

FIG. 8 is a cross-section of an exemplary display device 100 comprising an interferometric modulator comprising a transparent substrate 102, an optical stack 104, a mirror/mechanical assembly 106. The display device further comprises a diffuser 108.

The movable mirror 106 may comprise a metal layer as described above. As shown, the movable mirror is supported by posts 118. Other materials and designs are also possible. In some embodiments, the optical stack 104 comprises a transparent conductor, a partially reflective material and a dielectric as described above. Other configurations and designs are also possible.

The substrate 102 may comprise a transparent material such as, for example, glass, plastic, silica, alumina, and the like. In some embodiments, the substrate 102 is glass. In some embodiments the substrate is less than about 0.5 mm thick, for example, up to about 0.45 mm thick, or about 0.4 mm thick, or about 0.35 mm thick. In some embodiments the substrate is no more than about 0.3 mm thick, about 0.25 mm thick, or about 0.2 mm thick. In other embodiments, the substrate has a thickness of not greater than about 0.15 mm thick or about 0.1 mm. In some embodiments other thicknesses are also used. A thinner substrate also allows for the diffuser to be positioned closer to the interferometric cavity. Accordingly, the diffuser in some embodiments can be closer than about 0.45 mm from the optical stack. In some embodiments, the diffuser is about 0.4, 0.35, or 0.3 mm from the optical stack. In other embodiments, the diffuser is about 0.25, 0.2, 0.15, or 0.1 mm from the optical stack. In other embodiments, the diffuser may be closer or farther from the optical stack.

An advantageous aspect of the closer proximity of the diffuser to the light modulating elements (e.g. interferometric modulators) is an increase in attainable contrast for higher resolution displays. Contrast is a characteristic of a display related to the difference between luminance of the brightest white and darkest black. A measure of contrast can be qualitatively determined by computing the ratio of luminance between light and dark areas for a displayed test pattern. The displayed pattern may comprise alternating white and black lines such as alternating bright and dark columns or rows. The columns or rows of such a test pattern may each correspond to a single column or row of an interferometric modulator array. The ratio of the maximum luminance of the bright line and to the minimum luminance of the dark line as measured at the output of the display (after the diffuser) is a measure of the contrast.

The spatial resolution of a display is dependent on the spatial period of its elements, where spatial period is defined as the distance between like portions of adjacent elements. For example, where the distance from center to center, or left edge to left edge of adjacent rows of an array is a, the spatial period of the rows is a. The spatial resolution is, therefore, determined by the size and spacing of the individual light modulating elements, and is improved with the use of smaller elements which are positioned closer together.

If a diffuser is spaced apart from the light modulating elements by more than about one period, a, the scattering of the light by the diffuser detrimentally affects the contrast, and therefore, the viewer's perception of the pattern or other images formed by the display. With larger distances separating the diffuser from the light modulating elements, the light scattered by the diffuser deviates further from its original direction. As a result, instead of traveling directly to the viewer, light from a first light modulating element may be scattered by the diffuser such that it appears to have come from a second adjacent light modulating element. This deviation results in the redistribution of light and reduces the contrast observed by the viewer.

Consequently, maximum resolution for a desired contrast is limited by the diffuser spacing from the modulating elements. Closer diffuser proximity to the light modulating elements allows for use of smaller light modulating elements and smaller spatial periods to achieve higher resolution for a given desired contrast. For example, when the diffuser is placed about 0.45 mm from the interferometric modulator, a contrast of greater than about 5 to 1 may be attained while using a displayed test pattern of alternating white and black lines having a spatial period of about 0.45 millimeter (mm) for a display that also has a reflectivity at a viewing angle of about 45° that is at least about 75% of the reflectivity when viewed from normal. Similarly, when the diffuser is placed closer than about 0.3 mm, 0.2 mm, or 0.1 mm from the interferometric modulator, similar or better contrast and reflectivity performance under the same test conditions can be achieved for displays with arrays of light modulating elements having pitches of about 0.3 mm, 0.2 mm, or 0.1 mm, respectively. Other values outside these ranges, however, are also possible.

In some embodiments, the diffuser 108 comprises a suitable transparent or translucent polymer resin, for example, polyester, polycarbonate, polyvinyl chloride (PVC), polyvinylidene chloride, polystyrene, polyacrylates, polyethylene terephthalate, polyurethane, and copolymers or blends thereof. In other embodiments other materials are used. In some embodiments, the diffuser 108 is a composite comprising a polymer resin as described above and one or more other components. In some embodiments, the other component is inorganic. In other embodiments, the other component is organic. In some embodiments, the other component provides diffusion to the diffuser 108. For example, in some embodiments, optical beads are dispersed within the diffuser. In other embodiments, the diffuser 108 comprises a film coated with micron-sized optical beads. In some embodiments, the diffuser 108 is monolithic. The material from which the diffuser 108 is manufactured may be inherently diffusive. In some embodiments, a surface of the diffuser 108 is patterned to provide diffusion. Either the surface of the diffuser 108 proximal to the viewer, the surface distal to the viewer, or both are patterned. The diffusive patterns may comprise a random surface profile. Some embodiments use a combination of these diffusion mechanisms, for example, texturing a surface of an inherently diffusive material.

In some embodiments, the diffuser 108 is an inorganic material. In some embodiments, the inorganic material comprises an oxide and/or nitride, for example, silica or alumina. In some embodiments, the inorganic material is crystalline. In other embodiments, the inorganic material is amorphous. In other embodiments other materials are used.

In some embodiments the substrate 102 is thinner than the substrate used in typical interferometric modulator devices, which permits using a thicker diffuser 108, while maintaining a comparable or even thinner stack height for the device. In some embodiments, the diffuser 108 is at least about 0.1 mm, at least about 0.2 mm, or at least about 0.3 mm. In other embodiments the diffuser 108 is at least about 0.4 mm or at least about 0.5 mm. In some embodiments other thicknesses are also used. Advantages of using a thicker diffuser 108 may include any one of the following: more effective diffusion of light, lighter weight as the diffuser may comprise a lighter material than the substrate, and lower cost as the cost of a thick substrate may be higher than the cost of a thick diffuser. Additionally, in some embodiments, the diffuser 108 is more physically robust than a thinner diffuser, which improves yields. Also, in certain embodiments, the thicker diffuser 108 provides a more durable overall device 100. In some embodiments, a thicker diffuser 108 is more easily applied to the substrate 102 than a thinner diffuser, thereby improving throughput and/or reducing costs.

A further advantage of a thicker diffuser 108 is that the additional thickness permits one to incorporate additional functionality, for example, additional coatings. Examples include, but are not limited to antireflection, antiglare, and/or anti-scratch coatings of any type known in the art. In other embodiments, these additional functions are incorporated in the diffuse properties of the diffuser 108. In some embodiments, for example, the diffuser compensates for color shift as a function of view angle, for example, as disclosed in U.S. application Ser. No. 11/040,824, titled "METHOD AND DEVICE FOR COMPENSATING FOR COLOR SHIFT AS A FUNCTION OF ANGLE OF VIEW," filed Jan. 21, 2005, published as U.S. Patent Publication No. 2006/0077522, now U.S. Pat. No. 7,630,123, of which the disclosure is incorporated herein by reference in its entirety. As described above, thicker diffusers permit more diffusion. The thicker diffuser provides more optical path length through which to operate on the light propagating therethrough.

Figure 9:
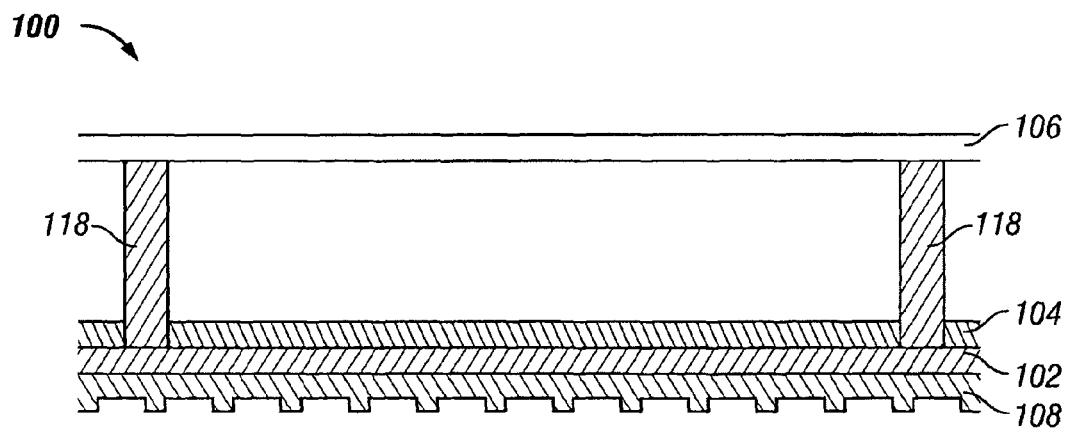
FIG. 9 illustrates a cross-section of an embodiment of a diffuser with an optical texture or optical features formed on a surface thereof.

In some embodiments the surface of the diffuser 108 proximal to the viewer, the surface distal to the viewer, or both are patterned to provide additional functionality, for example, to provide a lens and/or to control view angle. In the embodiment illustrated in FIG. 9, an optical texture or surface features is provided on the surface of the diffuser 108' proximal to the viewer. The optical texture is provided by any means known in the art, for example, embossing, etching, and the like. In the illustrated embodiment, the embossing forms lenses 110. This lens may be configured, for example, to collimate ambient light before it enters the interferometric modulator, thereby reducing a color shift effect that occurs at steep viewing angles. The optical texture may provide at least one of a holographic lens, a diffractive lens, and a Fresnel lens.

Figure 10:
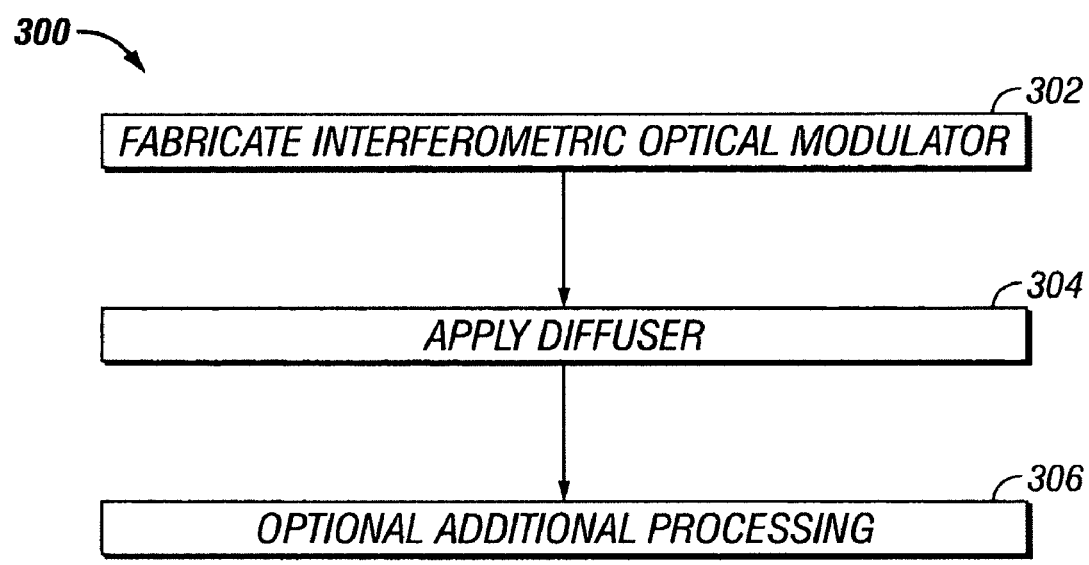
FIG. 10 provides a flowchart of a method for manufacturing a display device comprising an interferometric optical modulator and diffuser.

Also provided is a method for fabricating a display device 100 comprising an interferometric modulator and a diffuser 108. FIG. 10 is a flowchart illustrating an embodiment 300 of the method with reference to the device 100 illustrated in FIG. 8. In step 302, an interferometric modulator is fabricated on a substrate 102 using any method, for example, as described above or, for example, in U.S. Pat. No. 5,835,255, which is incorporated herein by reference in its entirety. U.S. application Ser. No. 10/941,042, titled "Method for fabricating a Structure for a Microelectromechanical System (MEMS) Device", filed Sep. 14, 2004, now U.S. Pat. No. 7,250,315, U.S. Provisional Application No. 60/613,496, titled "Method of Fabricating Interferometric Devices using Lift-Off Processing Techniques", filed Sep. 27, 2004, and U.S. Provisional Application No. 60/613,452, titled "Method of Making a Reflective Display Device using thin Film Transistor Production Techniques", filed Sep. 27, 2004, also describe structure and methods for fabricating interferometric modulators, and are incorporated herein by reference in their entirety.

In step 304, a diffuser 108 is then applied to the substrate 102. In some embodiments, the diffuser 108 is applied using an adhesive. In some embodiments, the adhesive is pre-applied to the diffuser 108. In other embodiments, the adhesive is applied to the substrate 102 after the fabrication of the interferometric modulator. Some embodiments use a two-part adhesive in which a first component is applied to the diffuser 108 and a second component is applied to the substrate 102. In some embodiments, the adhesive is pressure sensitive. In some embodiments, the adhesive is thermosetting. In other embodiments, the adhesive cures at about ambient temperature. In other embodiments, the adhesive is radiation-cured.

In some embodiments, the diffuser 108 is fabricated on the substrate 102. For example, in some embodiments, an uncured polymer resin is applied to the substrate 102 by means known in the art, for example, by spin coating, or calendaring. The polymer resin is then cured to form the diffuser 108.

Optional step 306 provides one or more additional processing steps. In some embodiments, an additional step is the application of additional layers or coatings to the diffuser 108, for example, an antireflective, antiglare, and/or anti-scratch coating as described above. In other embodiments, such coatings are pre-applied to or manufactured with the diffuser 108 and are applied simultaneously with the diffuser 108 in step 304. Another type of additional processing step modifies the surface of the diffuser 108 proximal to the viewer, for example, by polishing or roughening the surface, either chemically and/or physically. In another embodiment, an additional processing step provides an optical texture or surface features described above, for example, by embossing or engraving. In other embodiments, an optical texture or surface features are provided on the diffuser 108 prior to the application of the diffuser in step 304.

Variations in the process for forming the device 100 are possible. For example, additional steps may be included, steps may be removed, and the order of the steps may be altered. Similarly, the device may be configured differently. Additional components may be added, components may be removed or the order and placement of the components may be altered. The components may have different sizes, shaped, and features incorporated therein. The components may also comprise different materials. In certain embodiments each of the interferometric modulators in an array includes a separate diffuser. In other embodiments, a single diffuser is disposed forward a plurality of interferometric modulators, portions of the same diffuser overlapping individual interferometric modulators. Still other variations are possible in the arrangement of the component elements and the configuration as well as use and application of the device.

Accordingly, while the above detailed description has shown, described, and pointed out novel features as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others.

What is claimed is:

1. A display comprising:
a substrate having a first side and a second side; and
a plurality of interferometric light modulators disposed over the first side of the substrate, the plurality of interferometric light modulators having a pitch, each of the plurality of interferometric light modulators configured to be individually actuated to modulate light in response to an electrical signal, each of the interferometric light modulators including a resonant optical cavity,
wherein the substrate has a thickness between the first side and the second side that is less than approximately the pitch of the plurality of interferometric light modulators.

2. The display of claim 1, wherein at least some of the plurality of interferometric light modulators each include:
   a partial reflector; and
   a movable reflector spaced from the partial reflector by a gap, the movable reflector configured to move with respect to the partial reflector to alter the gap to interferometrically modulate light, the movable reflector configured to move in response to an electrical signal.

3. The display of claim 2, further including an electrode configured to cause the movable reflector to move with respect to the partial reflector in response to the electrical signal, the electrode disposed on the same side of the gap as the partial reflector.

4. The display of claim 1, wherein the display is configured as a reflective display.

5. The display of claim 1, wherein the pitch of the plurality of interferometric light modulators is less than about 0.45 mm.

6. The display of claim 1, wherein the pitch of the plurality of interferometric light modulators is less than about 0.3 mm.

7. The display of claim 1, wherein the pitch of the plurality of interferometric light modulators is less than about 0.2 mm.

8. The display of claim 1, wherein the pitch of the plurality of interferometric light modulators is less than about 0.1 mm.

9. The display of claim 1, further including a diffuser.

10. The display of claim 9, wherein the diffuser is disposed over the second side of the substrate.

11. The display of claim 10, wherein the display is configured such that the first side of the substrate is distal to a viewer of the display and the second side of the substrate is proximal to the viewer.

12. The display of claim 9, wherein the display is configured such that light incident on the display passes through the diffuser before being incident on the plurality of interferometric light modulators.

13. The display of claim 9, wherein the diffuser is disposed over the first side of the substrate, and the plurality of interferometric light modulators are disposed over the diffuser.

14. The display of claim 9, wherein the diffuser has a thickness of less than about 0.4 mm.

15. The display of claim 9, wherein the diffuser includes a material having a lower density than the substrate.

16. The display of claim 9, wherein the diffuser is a composite including two or more components, wherein at least one of the two or more components provides diffusion to the diffuser.

17. The display of claim 1, further comprising:
   a processor configured to process image data; and
   a memory device in electrical communication with the processor.

18. The display of claim 17, further including a driver circuit configured to send at least one signal to the display.

19. The display of claim 18, further including a controller configured to send at least a portion of the image data to the driver circuit.

20. The display of claim 17, further including an image source module configured to send the image data to the processor.

21. The display of claim 20, wherein the image source module includes at least one of a receiver, transceiver, and transmitter.

22. The display of claim 17, further including an input device configured to receive input data and to communicate the input data to the processor.

23. A display comprising:
   a substrate having a first side and a second side; and
   a plurality of means for interferometrically modulating light, the plurality of interferometrically modulating light means disposed over the first side of the substrate, the plurality of interferometrically modulating light means having a pitch, each of the plurality of interferometrically modulating light means configured to be individually actuated to modulate light in response to an electrical signal, each of the interferometrically modulating light means including a resonant optical cavity,
   wherein the substrate has a thickness between the first side and the second side that is less than approximately the pitch of the plurality of interferometrically modulating light means.

24. The display of claim 23, wherein the interferometrically modulating light means includes an interferometric light modulator.

25. The display of claim 23, wherein the interferometrically modulating light means includes:
   a partial reflector; and
   a movable reflector spaced from the partial reflector by a gap, the movable reflector configured to move with respect to the partial reflector to alter the gap to interferometrically modulate light, the movable reflector configured to move in response to an electrical signal.

26. The display of claim 25, further including an electrode configured to cause the movable reflector to move with respect to the partial reflector in response to the electrical signal, the electrode disposed on the same side of the gap as the partial reflector.

27. The display of claim 23, wherein the display is configured as a reflective display.

28. The display of claim 23, wherein the pitch of the plurality of interferometrically modulating light means is less than about 0.45 mm.

29. The display of claim 23, further including means for diffusing light.

30. The display of claim 29, wherein the diffusing means includes a diffuser.

31. The display of claim 29, wherein the means for diffusing light is disposed over the second side of the substrate.

32. The display of claim 29, wherein the means for diffusing light is disposed over the first side of the substrate and the plurality of interferometrically modulating light means are disposed over the diffuser.

33. A method of manufacturing a display, the display including a plurality of display elements having a spatial pitch, the method comprising, for each display element:
   forming a movable reflector;
   forming a partial reflector positioned at a distance from the movable reflector thereby forming an optical resonator cavity; and
   forming an electrode configured to cause the movable reflector to move with respect to the partial reflector to alter the optical resonator cavity;
   wherein the movable reflector, the partial reflector and the electrode are disposed over one side of a substrate, the substrate having a thickness of less than approximately the spatial pitch of the plurality of display elements.

34. The method of claim 33, wherein the spatial pitch of the plurality of display elements is approximately 0.45 millimeter or less.

35. The method of claim 33, further including providing a diffuser spaced apart from the partial reflector.

36. The method of claim 35, wherein the substrate has a first side and a second side, and the movable reflector, the partial reflector and the electrode are disposed over the first side of the substrate, the method including disposing the diffuser over the second side of the substrate.

37. The method of claim 35, wherein the substrate has a first side and a second side, the method including disposing the diffuser over the first side of the substrate and disposing the movable reflector, the partial reflector and the electrode over the diffuser.

* * * * *

UNITED STATES PATENT AND TRADEMARK OFFICE
CERTIFICATE OF CORRECTION

PATENT NO. : 8,184,358 B2
APPLICATION NO. : 13/093532
DATED : May 22, 2012
INVENTOR(S) : Clarence Chui It is certified that error appears in the above-identified patent and that said Letters Patent is hereby corrected as shown below:

In column 1 (page 2, item 56) at line 22, Under Other Publications, change "11/29,143," to --11/209,143,--.

In column 2 (page 2, item 56) at line 4, Under Other Publications, change "Inerview" to --Interview--.

In column 2 (page 2, item 56) at line 10, Under Other Publications, change "12/207,932," to --12/607,932,--.

In column 2 at line 47, change "minor" to --mirror--.

In column 3 at line 8, change "minor" to --mirror--.

In column 6 at line 49, change "$V_{bias}$." to -- $-V_{bias}$.--.

Signed and Sealed this
Second Day of October, 2012

David J. Kappos
*Director of the United States Patent and Trademark Office*